Figure 1:
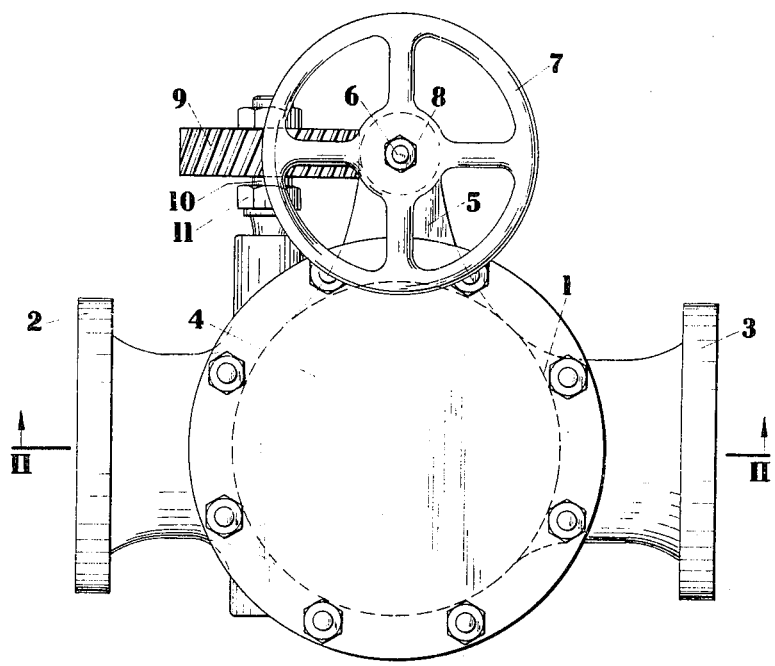

Jan. 11, 1966        KATUMI EGASHIRA        3,228,651
VALVE
Filed Nov. 29, 1962        2 Sheets-Sheet 1

INVENTOR.
KATUMI EGASHIRA

BY
AGENT 3,228,651
VALVE
Katumi Egashira, 3 chome, Kamiyamamachi, Yahatashi,
Fukuoka, Japan
Filed Nov. 29, 1962, Ser. No. 240,983
Claims priority, application Japan, Mar. 27, 1962,
37/11,245
11 Claims. (Cl. 251—122)

This invention relates to valves, and more particularly to valves for controlling the flow of a mixture of fluid and solid materials.

The material mixtures whose flow may be controlled by the valve of the invention include slurries of solids suspended in, or entrained by, liquids and streams of gases entraining solid materials. Specific examples of such slurries and streams are mixtures of water and comminuted minerals and mixtures of air and cereal grains. It is conventional to transport particulate solid matter over great distances by entraining the solids in a stream of fluid. The control of such streams by means of valves is difficult because of the combined effects of the abrasive solid and of the fluid which must flow at high velocity and/or under high pressure to convey the solid particles.

The object of the invention is a valve, more specifically a shut-off valve, for reliably controlling the flow of mixtures of fluids and solids.

A more specific object is the provision of such a valve in which relative movement of a valve member and of a valve seat transverse to the sealing pressure is avoided after the seat and member have made contact during closing of the valve.

Another object is the provision of a valve in which relative movement of a valve actuating spindle or shaft and of a stuffing box in the direction of the spindle axis is avoided.

A further object is the provision of a valve in which cooperating sealing faces on a movable valve member and on a valve seat member do not directly face the direction of flow of the mixture to be controlled.

An additional object is the avoidance of an abrupt pressure drop at the cooperating sealing faces of the movable valve member and of the valve seat member.

Yet another object is the provision of means in a valve of the type described for excluding solid particles of the controlled mixture from the space between the sealing faces of valve member and valve seat immediately prior to contact between the faces during closing of the valve.

With these and other objects in view, the valve of the invention in one of its aspects consists mainly of a conduit, a valve seat in the conduit, a composite valve member movable in the conduit toward and away from an operative shut-off position, and of actuating means for moving the valve member toward its operative position. The valve seat has an axis and two annular sealing faces about the axis. A first one of these faces flares axially in the direction of flow of the controlled mixture. The second face is spaced from the first face in the direction of flow and is transverse of the valve seat axis. The composite valve member has three parts. One part is a disc having a sealing face which conformingly abuts against the aforementioned second face when the valve member is in its operative position. Another valve member part is a deflector fastened to the disc and flaring in the aforementioned flow direction. When the valve member is in its operative position, the deflector and the first face of the valve seat form a relatively narrow and long channel. A stack of flat annular disc retained between the disc and deflector is the third part. It sealingly engages the flaring sealing face of the valve seat.

Figure 2:
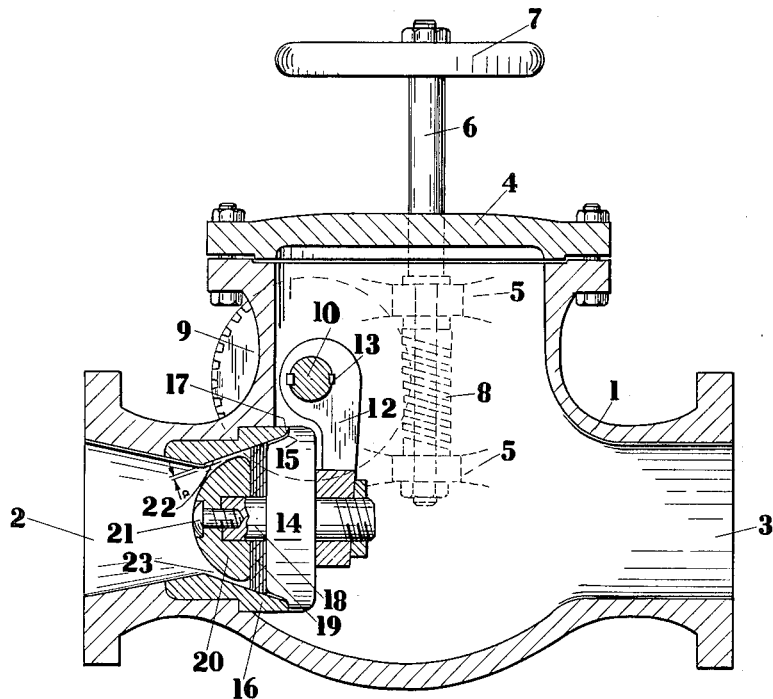

Other features and many of the attendant advantages of this invention will be readily appreciated as the same becomes better understood by reference to the following detailed description of a preferred embodiment when considered in connection with the accompanying drawing in which:

FIG. 1 shows a valve of the invention in plan view; and
FIG. 2 illustrates the valve of FIG. 1 in section on the line II—II.

Referring now to the drawing in detail, and initially to FIG. 1, there are seen the integral intake conduit 2 and outlet conduit 3 of a valve body 1. The hollow valve body is closed by a flanged cover 4. Brackets 5 project laterally from the valve body 1 and constitute a yoke on which a spindle 6 is rotatably supported. A handwheel 7 is mounted on a terminal portion of the spindle 6 which also carries a worm 8. The worm cooperates with a wormwheel 9 secured on a shaft 10. The shaft extends through a stuffing box 11 into the interior of the valve body 1.

As seen in FIG. 2, one end of an arm 12 is fixedly fastened to the shaft 10 by keys 13. The other end of the arm carries a valve disc 14 which moves substantially in the direction of its axis when the arm 12 pivots in the stuffing box 11. The face of the disc 14 opposite the intake conduit 2 has a narrow flat annular portion 15 in a radial plane. The central portion of the disc face rises from that plane toward the intake conduit.

A valve seat member 16, which is an insert of abrasion resistant material and has the approximate shape of a venturi, is coaxially arranged in the intake conduit 2. It has two conical internal faces which respectively converge and diverge in the direction of flow. A radial end face 17 provides a conforming seat for the face portion 15 of the disc 14. A stud 18 axially projects from the disc 14 toward the intake conduit 2. A stack of superposed flat annular discs 19 is coaxially arranged on the stud 18 and is held in position against the valve disc 14 by a flat radial face of a deflector 20. The deflector has an approximately paraboloidal face opposite the intake conduit 2 and is attached to the stud 18 by a screw 21.

In the shut-off position of the valve illustrated in FIG. 2, the face portion 15 of the valve disc 14 abuts axially against the conforming end face 17 of the venturi-shaped seat member 16. The circumferential edge portions of the several discs 19 are in contact with the conical face 22 of the valve seat member 16 which flares in the direction of flow through the valve. The deflector 20 and the face 22 constitute the walls of an annular gap or channel 23 which leads from the intake conduit 2 toward the seal formed by the stacked discs 19. The channel 23 tapers in the direction of flow but every portion of the deflector 20 is at least spaced a distance $a$ from the face 22.

The materials of construction for the valve of the invention will be chosen to meet specific service requirements. Generally, hard and abrasion resistant metals will be preferred, particularly where serviceability at elevated temperatures is required. The arm 12 is subject to severe stresses. It should, therefore, be as short as practical and particular care is to be taken in the selection of its material. Even with a worm 8 of relatively fine pitch, the force required for turning the handwheel 7 is high under the usual conditions of operation for which this valve is intended. The spindle 6 and associated elements of the valve are preferably dimensioned and their material is selected, in such a manner as to permit operation of the valve by blows, as of a hammer, applied to the spokes of the wheel 7. A hydraulic or other power operated valve actuator will be found necessary in some instances.

The discs 19 are preferably of yieldably resilient material. Several types of synthetic rubber, such as the chloroprene type, have been found satisfactory but metallic discs have also been employed successfully. It is essential that the circumferential lip portions of the discs be capable of adequate elastic deformation. The discs are protected against excessive deformation by the faces of the valve disc 14 and of the deflector 20 between which they are retained.

When the valve is being closed by moving the composite valve member axially of the intake conduit opposite to the direction of fluid flow, the deflector 20 forms a tapering channel with the face 22 of the valve seat member 16. When the valve approaches its shut off position, the gap between the discs 19 and the valve seat member 16 becomes so narrow as to prevent passage of solids while still permitting passage of fluid. This fluid stream, strained of solids, sweeps residual solid particles from the opposite sealing faces 15 and 17 of the valve disc 14 and of the valve seat 16. Eventually, these faces are engaged. Before this stage is reached, however, the circumferential edge portions of the discs 19 make contact with the flaring sealing face 22 of the seat member 16. Closing of the valve thus proceeds in several steps in which passage of solids is stopped first and the sealing faces are purged. The passage of fluid is reduced next not only by the gradual reduction in flow section of the channel 23 but also by the engagement of the discs 19 with the seat face 22. Ultimately, the engaging sealing faces of the disc 14 and of the valve seat member 16 form a tight seal.

The valve of the invention permits a conduit carrying a mixture of solids and fluids to be shut off tightly. The valve retains its tightness for long periods of operation because of the several structural features enumerated above which prevent damage to the sealing faces. There is no relative movement of the valve disc 14 and of the valve seat member 16 after their faces 15, 17 have made contact. What little movement may occur due to the unavoidable resilience of even the most rigid materials is in a direction of face against face. There is no grinding movement in the plane of the interface in which small amounts of the conveyed solid could act as an abrasive.

The stuffing box 11 has an extremely long useful life. There is very little relative movement between the shaft 10 and the box during opening and closing of the valve. All relative movement is rotatory. The shaft does not move axially in the stuffing box. There is no tendency to drag solid particles between the cooperating surfaces of the shaft and of the stuffing box.

The sealing faces 15, 17 of the valve disc 14 and of the valve seat member 16 are protected from direct impact of the conveyed solid particles by their location and by the deflector 20 whose dimensions are not critically affected by abrasion. During the last stages of the closing operation, the pressure drop along the annular flow channel adjacent the composite valve member is well distributed. There is no sudden pressure drop with concurrent localized high flow velocity in any particular portion of the channel. The rapid wear by erosion which is associated with such concentrated areas of very high fluid velocity is thus avoided.

It should be understood, of course, that the foregoing disclosure relates only to a preferred embodiment of the invention and that it is intended to cover all changes and modifications of the example of the invention herein chosen for the purpose of the disclosure which do not constitute departures from the spirit and scope of the invention set forth in the appended claims.

What I claim is:

1. A valve for controlling the flow of fluid carrying solid particles comprising, in combination:
    (a) a conduit;
    (b) valve seat means in said conduit having an axis and two annular faces about said axis,
        (1) one of said faces flaring axially in a predetermined direction, and
        (2) the other face being spaced from said one face in said direction and extending transversely of said axis and of said one face;
    (c) a composite valve member movable toward and away from an operative position controlling flow therethrough said conduit; and including
        (1) disc means having a face abuttingly engaging said other face of said valve seat means when said valve member is in the operative position thereof;
        (2) a deflector member secured to said disc means, said deflector member flaring in said direction and being spaced from said one face of said valve seat means to define therewith an annular channel having a radial width substantially smaller than the axial length thereof when said valve member is in the operative position thereof; and
        (3) packing means retained between said disc means and said deflector member and projecting into said channel for straining said particles from said fluid when said valve member approaches said operative position during the movement thereof, and for conforming sealing engagement with said one face of said valve seat means in said operative position of said valve member; and
    (d) actuating means for moving said valve member into said operative position in a direction opposite to said predetermined direction.

2. A valve as set forth in claim 1, wherein said one face of said valve seat means is substantially conical.

3. A valve as set forth in claim 2, wherein said deflector member has a guide face opposite said one face of said valve seat means, said guide face being or arcuate section in an axial plane, whereby said channel tapers in said predetermined axial direction.

4. A valve as set forth in claim 1, wherein said packing means include a plurality of axially superposed disc members having respective circumferential portions sealingly engageable with said one face of said valve seat means.

5. A valve as set forth in claim 4, wherein said disc members are of resiliently yieldable material.

6. A valve as set forth in claim 1, wherein said actuating means include arm means having one portion pivotally fastened to said conduit and another portion spaced from said one portion and secured to said valve member for movement of the latter toward and away from said operative position thereof when said one portion of said arm means pivots on said conduit; and motion transmitting means for actuating pivoting movement of said arm means.

7. A valve as set forth in claim 6, wherein said motion transmitting means include a shaft member having one end portion in said conduit and another end portion outside said conduit, a portion of said shaft member intermediate said end portions being rotatably mounted on said conduit, said arm means being fastened to said one end portion, and means for rotating said other end portion.

8. A valve as set forth in claim 1, wherein said valve seat means has a third annular face about said axis, said third face being spaced from said one face in said opposite direction and flaring in said opposite direction, said one face and said third face jointly constituting venturi means.

9. A valve for controlling the flow of a fluid carrying solid particles comprising, in combination:
    (a) a valve seat having an axis and three annular faces about said axis,
        (1) two of said faces respectively converging and diverging in a predetermined direction to constitute venturi means, (2) the third face of said valve seat being spaced from said venturi means in said direction and extending transversely of said axis and of said diverging face;

(b) a composite valve member axially movable toward and away from an operative position in which said valve member engages said valve seat, said valve member including (1) a disc member having a face portion sealingly engaging said third face of said valve seat in the operative position of said valve member;

(2) a deflector member secured to said disc member, said deflector member having an annular guide face in said venturi means, said guide face defining an annular channel in said venturi means with said diverging face when said valve member is in said operative position; and (3) annular resilient packing means retained between said disc member and said deflector member, said packing means projecting radially from said deflector member toward said diverging face for straining said particles from said fluid when said valve member approaches said operative position during the movement thereof, and for sealing engagement with said diverging face in said operative position; and (c) actuating means for moving said valve member into said operative position in a direction opposite to said predetermined direction.

10. A valve as set forth in claim 9, wherein another portion of said disc member extends into said venturi means and is spaced from said diverging face in said operative position.

11. A valve as set forth in claim 9, wherein said packing means sealingly engage said diverging face during movement of said valve member into said operative position in said opposite direction before said face portion of the disc member sealingly engages said third face of said valve seat.

References Cited by the Examiner
UNITED STATES PATENTS

| | | | |
|---|---|---|---|
| 1,211,452 | 1/1917 | Kersteter | 137—513.3 X |
| 1,616,420 | 2/1927 | Wilson | 251—362 |
| 2,255,404 | 9/1941 | White et al. | 137—516.25 |
| 2,274,776 | 3/1942 | Cull | 251—298 X |
| 2,485,092 | 10/1949 | Gannon | 251—332 |
| 2,912,003 | 11/1959 | Lagerwey | 137—547 |

M. CARY NELSON, *Primary Examiner.*

ISADOR WEIL, MARTIN P. SCHWADRON,
*Examiners.*